US010974545B2

(12) United States Patent
Albl et al.

(10) Patent No.: US 10,974,545 B2
(45) Date of Patent: Apr. 13, 2021

(54) WHEEL BEARING ARRANGEMENT FOR A MOTOR VEHICLE

(71) Applicant: AUDI AG, Ingolstadt (DE)

(72) Inventors: Johannes Albl, Ingolstadt (DE); Michael Frisch, Schönberg (DE)

(73) Assignee: AUDI AG, Ingolstadt (DE)

(*) Notice: Subject to any disclaimer, the term of this patent is extended or adjusted under 35 U.S.C. 154(b) by 3 days.

(21) Appl. No.: 16/346,917

(22) PCT Filed: Oct. 9, 2017

(86) PCT No.: PCT/EP2017/075635
§ 371 (c)(1),
(2) Date: May 2, 2019

(87) PCT Pub. No.: WO2018/086808
PCT Pub. Date: May 17, 2018

(65) Prior Publication Data
US 2020/0055333 A1    Feb. 20, 2020

(30) Foreign Application Priority Data

Nov. 10, 2016 (DE) ............. 10 2016 222 110.8

(51) Int. Cl.
*B60B 27/00* (2006.01)
*F16C 19/18* (2006.01)
(Continued)

(52) U.S. Cl.
CPC ...... *B60B 27/0073* (2013.01); *B60B 27/0068* (2013.01); *F16C 19/184* (2013.01);
(Continued)

(58) Field of Classification Search
CPC ............ F16C 33/586; F16C 33/7879; F16C 33/7886; F16C 33/7896; F16C 33/805; F16C 41/007; B60B 27/0073
See application file for complete search history.

(56) References Cited

U.S. PATENT DOCUMENTS 3,510,138 A  *  5/1970 Bowern ............... F16J 15/3264
                                                         277/571
5,451,869 A     9/1995 Alff
(Continued)

FOREIGN PATENT DOCUMENTS

CN    101965268 A    2/2011
CN    103016539 A    4/2013
(Continued)

OTHER PUBLICATIONS

Office Action dated May 8, 2020 in corresponding European Application No. 17 780 752.6; 8 pages including partial machine-generated English-language translation.
(Continued)

*Primary Examiner* — James Pilkington
(74) *Attorney, Agent, or Firm* — Maier & Maier, PLLC

(57) ABSTRACT

A wheel bearing arrangement for a motor vehicle, including a wheel support and a wheel hub which is rotatably mounted on the wheel support by a wheel bearing in order to secure a wheel and to which a shaft is rotationally fixed, wherein a wheel bearing seal sealingly lies, on the one hand, against an inner ring of the wheel bearing, said inner ring sitting on the wheel hub, and, on the other hand, against an outer ring of the wheel bearing, said outer ring being secured to the wheel support. It is provided here that a wheel bearing pre-seal is rotationally fixed to the shaft adjacently to the wheel bearing
(Continued)

and engages by a seal protrusion in a pre-seal receiving area formed in at least some sections between the outer ring and the wheel support.

18 Claims, 2 Drawing Sheets

(51) Int. Cl.
    *F16C 33/78* (2006.01)
    *F16C 41/00* (2006.01)
    *F16C 33/58* (2006.01)

(52) U.S. Cl.
    CPC ........ *F16C 33/586* (2013.01); *F16C 33/7879* (2013.01); *F16C 41/007* (2013.01); *B60B 27/0005* (2013.01); *F16C 2326/02* (2013.01)

(56) References Cited

U.S. PATENT DOCUMENTS

| | | | |
|---|---|---|---|
| 7,011,451 B2 | 3/2006 | Tajima et al. | |
| 7,793,939 B2* | 9/2010 | Ishikawa | F16C 33/7813 277/353 |
| 8,167,500 B2* | 5/2012 | Furukawa | F16C 33/7879 384/484 |
| 8,777,491 B2 | 7/2014 | Wang et al. | |
| 2004/0197039 A1 | 10/2004 | Sakamoto et al. | |
| 2008/0285902 A1 | 11/2008 | Nagayama et al. | |
| 2009/0153136 A1* | 6/2009 | Kobayashi | F16C 41/007 324/207.25 |
| 2011/0148182 A1 | 6/2011 | Walter et al. | |
| 2013/0069332 A1 | 3/2013 | Wang et al. | |
| 2016/0059626 A1 | 3/2016 | Gemello et al. | |
| 2016/0178010 A1 | 6/2016 | Kaiser et al. | |

FOREIGN PATENT DOCUMENTS

| | | | |
|---|---|---|---|
| CN | 105465185 A | | 4/2016 |
| CN | 105518325 A | | 4/2016 |
| DE | 25 05 081 A1 | | 8/1976 |
| DE | 44 25 732 A1 | | 1/1996 |
| DE | 201 02 451 U1 | | 5/2001 |
| DE | 699 08 493 T2 | | 12/2003 |
| DE | 10 2008 038 682 A1 | | 2/2010 |
| DE | 102012208055 | * | 11/2013 |
| JP | 2002-327769 A | | 11/2002 |
| JP | 2008223783 | * | 9/2008 |
| JP | 5003272 B2 | | 8/2012 |
| JP | 2014-142054 A | | 8/2014 |
| JP | 2015117797 | * | 6/2015 |

OTHER PUBLICATIONS

Examination Report dated Jun. 29, 2017 of corresponding German application No. 10 2016 222 110.8; 16 pages.
International Search Report and Written Opinion of the International Searching Authority dated Jan. 23, 2018 in corresponding International application No. PCT/EP2017/075635; 24 pages.
Office Action dated Jan. 3, 2020, in corresponding Chinese Application No. 201780069228.8; 11 pages.
International Preliminary Report on Patentability (Chapter I) dated May 14, 2019, of corresponding International application No. PCT/EP2017/075635; 8 pages.
Office Action dated May 8, 2020, in corresponding European patent application No. 17 780 752.6 including partial machine-generated English language translation, 8 pages.
Chinese Office Action dated Sep. 7 2020, in connection with corresponding CN Application No. 201780069228.8 (7 pages, including machine-generated English language translation).
Office Action dated Jan. 18, 2021 in corresponding European Application No. 17 780 752.6; 9 pages including partial machine-generated English-language translation.

* cited by examiner

WHEEL BEARING ARRANGEMENT FOR A MOTOR VEHICLE

FIELD

The disclosure relates to a wheel bearing arrangement for a motor vehicle, including a wheel support and a wheel hub which is rotatably mounted on the wheel support by means of a wheel bearing in order to secure a wheel and to which a shaft is rotationally fixed, wherein a wheel bearing seal sealingly lies, on the one hand, against an inner ring of the wheel bearing, said inner ring sitting on the wheel hub, and, on the other hand, against an outer ring of the wheel bearing, said outer ring being secured to the wheel support.

BACKGROUND

The wheel bearing arrangement is used for the rotatable mounting of at least one wheel on a body of the motor vehicle. The wheel bearing arrangement is here preferably part of a wheel suspension which is used for the suspension, in particular for the sprung suspension, of the wheel with respect to the body. The wheel is rotatably mounted on the wheel support of the wheel bearing arrangement. For this purpose, the wheel can be secured to the wheel hub which in the end is rotatably mounted on the wheel support by means of the wheel bearing. The wheel support comprises, for example, a wheel bearing receiving area which can be formed as an opening in the wheel support, in particular an opening with closed margin.

The wheel bearing is arranged in the wheel bearing receiving area. In addition, the wheel hub and/or the shaft rotationally fixed thereto engage(s) in at least some sections in the wheel bearing receiving area. Particularly preferably, the wheel hub and/or the shaft, in particular together, reach at least partially, in particular completely through the wheel bearing receiving area in axial direction with respect to a rotation axis of the wheel hub.

The wheel bearing comprises the inner ring and the outer ring. It is preferably in the form of a roller bearing so that between the inner ring and the outer ring, roller bodies are present for friction reduction. The inner ring is connected to the wheel hub, for example, it is designed so as to form one piece with it or is secured to it, while the outer ring is secured to the wheel support. Here, the outer ring is preferably present in the wheel bearing receiving area. In other words, the outer ring lies by its outer peripheral surface against an inner peripheral surface of the wheel bearing receiving area.

The shaft already mentioned above is rotationally fixed to the wheel hub. In principle, this can be provided in any desired manner. For example, the shaft is friction-locked and/or form-fit and/or firmly bonded to the wheel hub. It is possible to provide that the wheel hub and the shaft are designed to form a single piece, so that they are present as a single common component which can be referred to as a wheel hub arrangement, for example. If the wheel hub and the shaft are designed to form a single piece together, then they are preferably uniform in terms of material, that is to say they are made of the same material. Naturally, multi-piece design is also possible. In such a design, the wheel hub and the shaft are formed separately from one another and subsequently connected to one another.

The wheel support is preferably connected via at least one suspension link to the body. The suspension link thus engages, on the one hand, on the body and, on the other hand, on the wheel support, in particular in each case in a pivotable manner. The suspension link is present in the form of a transverse link, for example. However, a design in the form of a longitudinal link is also possible. In principle, the connection of the wheel support occurs via the at least one suspension link. However, preferably, several suspension links are provided for the connection of the wheel support to the body. In particular, the suspension link is in the form of a two-point link.

In order to prevent the penetration of moisture and/or dirt into the wheel bearing, the wheel bearing seal is provided. Said wheel bearing seal seals the inner ring and the outer ring with respect to one another, that is to say it lies sealingly both against the inner ring and against the outer ring. For example, the wheel bearing seal is here rotationally connected to one of the rings, that is to say either the inner ring or the outer ring, while it rotatably lies against the respective other ring, that is to say the outer ring or the inner ring. During a rotation of the wheel support with respect to the wheel hub and during a corresponding rotation of the inner ring with respect to the outer ring, a rotation of the wheel bearing seal with respect to one of the rings is therefore present. Particularly preferably, the wheel bearing seal is accommodated between the inner ring and the outer ring, so that, viewed in axial direction with respect to the rotation axis of the wheel hub, it thus overlaps with the wheel bearing. In particular, it does not protrude in axial direction beyond the wheel bearing.

From the prior art, the published document DE 699 08 493 T2 is known, for example. It describes a wheel bearing device comprising: an outer ring secured to a car body side, an inner ring which is rotatably mounted on the outer ring via roller bodies and which is thus secured to a side of a drive shaft in such a manner that it rotates together with said drive shaft, a pulse encoder ring, and a seal with a metal ring and an annular elastic part, wherein a proximal end of the metal ring is secured firmly to an end surface side of the outer ring, which corresponds to an end surface side of the inner ring, and wherein the annular elastic part is secured on a distal end of the metal ring, wherein the pulse encoder ring is surrounded by the seal and wherein a pick-up sensor is mounted on the metal ring so that it is located opposite the pulse encoder ring. Here, it is provided that the pulse encoder ring is firmly secured on the one end surface side of the inner ring and that the elastic part is brought in close and movable contact with an outer peripheral surface of the drive shaft.

Moreover, the published document DE 201 02 451 U1 describes a wheel bearing unit for a motor vehicle, with a wheel bearing arranged in a pivot bearing and an accommodated universal shaft which, by a joint housing, faces a receiving element of the pivot bearing. Here it is provided that the directly facing areas of the receiving element and the joint housing present a reduction in thickness, and an annular gap forming between the receiving element and the joint housing can be bridged by a sealing ring which can be pressed onto the universal shaft.

SUMMARY

Finally, the published document DE 25 05 081 A1 describes an arrangement for the mounting of a vehicle wheel, in particular of a motor vehicle, with an outer bearing part comprising a bearing bore and with an inner bearing part which is mounted by means of the roller bearing in the bearing bore and contains the stub axle, wherein the one bearing part is in connection with the vehicle wheel and the other bearing part is in connection with wheel guide members hinged to the vehicle body, and wherein, in the bearing gap located next to the roller bearing between the inner and the outer bearing part, a sealing device is provided, which works together with a peripheral groove arranged on the outer bearing part and which starting on the front side of the outer bearing part is introduced into the bearing bore. Here, it is provided that the peripheral groove has an undercut and that a truncated conical thrower ring, the narrowing part of which is secured on the inner bearing part, protrudes by a broadening part into the undercut groove.

The aim of the invention is to propose a wheel bearing arrangement for a motor vehicle, which has advantages in comparison to known wheel bearing arrangements, having in particular a more reliable sealing of the wheel bearing with respect to the outside environment. In particular, the introduction of moisture and/or dirt in the direction of the wheel bearing seal should already be prevented, so that the latter merely represents a kind of secondary seal.

Here it is provided that a wheel bearing pre-seal is rotationally connected on the shaft adjacently to the wheel bearing and engages by a seal protrusion in a pre-seal receiving area formed in at least some sections between the outer ring and the wheel support.

In addition to the wheel bearing seal, the wheel bearing pre-seal is used to improve the sealing action. The wheel bearing pre-seal here is used here, as its name implies, as a pre-seal, while the wheel bearing seal functions as a secondary seal. This means that the wheel bearing pre-seal and the wheel bearing seal are present in a series arrangement in a flow path between the outside environment, on the one hand, and the wheel bearing, on the other hand, wherein the wheel bearing pre-seal is present on the side facing the outside environment or on the side of the wheel bearing seal facing away from the wheel bearing. The wheel bearing pre-seal is present, for example, in the form of a plate, in particular a metal plate, or the like.

The wheel bearing pre-seal is arranged adjacently to the wheel bearing. This means that, viewed in axial direction with respect to the rotation axis of the wheel hub, it is located in particular directly next to the wheel bearing and/or the wheel bearing seal. Viewed in cross section, the wheel bearing pre-seal here at least partially overlaps with the wheel bearing. Viewed in cross section or in axial direction, the overlap between the wheel bearing pre-seal and the wheel bearing is achieved in particular by means of the seal protrusion. The seal protrusion of the wheel bearing pre-seal for this purpose engages in the pre-seal receiving area which is formed in at least some sections between the outer ring and the wheel support.

The pre-seal receiving area is formed, for example, by a receiving area formed in the outer ring and/or the wheel support. Preferably, the seal protrusion engages in a contactless manner in the pre-seal receiving area, that is to say, viewed in radial direction, at a distance from the outer ring, the wheel support or from both the outer ring and the wheel support. Preferably, viewed in radial direction, the pre-seal receiving area is limited, on the one hand, by the outer ring, and, on the other hand, by the wheel support. For example, for this purpose, the wheel support comprises a corresponding receiving area with an initially open margin, which leads into the wheel bearing receiving area. Subsequently, the wheel bearing is arranged in the wheel bearing receiving area in such a manner that, by its outer ring, in particular by the outer peripheral surface of the outer ring, it limits the pre-seal receiving area in radial direction.

The pre-seal receiving area is preferably present as a groove which is at least partially peripheral in peripheral direction, so that it can also be referred to as pre-seal receiving area groove. The pre-seal receiving area has, for example, a substantially rectangular cross section, that is to say it is limited in axial direction by a bottom, on which two side walls separated apart from one another in radial direction stand vertically viewed in longitudinal section with respect to the rotation axis. The bottom and one of the side walls are then preferably formed by the wheel support, while another of the side walls is formed by the outer ring of the wheel bearing. Due to the engagement of the seal protrusion in the pre-seal receiving area, a labyrinth seal is implemented.

The wheel bearing pre-seal is rotationally connected on the shaft and thus rotationally fixed to the wheel hub. Here, reference is made in particular to the above explanations according to which the wheel hub and the shaft can be designed to form a single piece and/or as uniform in terms of material. In the case of a rotation of the wheel hub with respect to the wheel support, the wheel bearing pre-seal rotates together with the wheel hub. Accordingly, there is also rotation of the seal protrusion in the pre-seal receiving area. Viewed in longitudinal section, the wheel bearing pre-seal protrudes completely overlaps in radial direction a bearing gap present between the outer ring and the inner ring of the wheel bearing. In particular, the wheel bearing pre-seal extends in radial direction starting from the shaft to the pre-seal receiving area, wherein, viewed in radial direction, the pre-seal receiving area is located farther outside than the shaft or a connection site of the wheel bearing pre-seal onto the shaft.

In the context of another design of the invention, it is provided that, viewed in longitudinal section with respect to a rotation axis of the wheel hub, the wheel bearing pre-seal comprises a first arm engaging on the shaft and a second arm forming the seal protrusion and angled with respect to the first arm. The wheel bearing pre-seal thus consists of at least the first arm and the second arm. These two arms are angled with respect to one another, thus they enclose an angle of more than 0° and less than 180°. Particularly preferably, the two arms are perpendicular to one another, that is to say they form an angle of 90° with respect to one another.

Viewed in longitudinal section, each of the arms in each case extends preferably straight. The first arm stands, for example, perpendicularly to the rotation axis of the wheel hub, at least approximately. The second arm which forms the seal protrusion, on the other hand, is preferably arranged parallel to the rotation axis. In addition to the first arm and the second arm, the wheel bearing pre-seal can comprise a third arm. This third arm is used in particular for securing the wheel bearing pre-seal on the shaft. Preferably, the third arm is present on the side of the first arm which faces the second arm with respect to the first arm. The second arm and the third arm thus start from the first arm. The third arm in turn is angled with respect to the first arm; for example, it stands perpendicularly to it. To that extent, the third arm is present for example parallel to the rotation axis.

It is preferable to provide that the third arm lies flat against the shaft or against an outer periphery of the shaft, in particular continuously peripherally. In this manner, a reliable securing of the wheel bearing pre-seal on the shaft is achieved. Viewed in axial direction, the third arm extends preferably starting from the first arm in another direction than the second arm. Starting from the first arm, the second arm and the third arm thus point in axial direction in opposite directions.

In the context of a preferred embodiment of the invention, it is provided that, peripherally with respect to the rotation axis of the wheel hub, the wheel bearing pre-seal continuously surrounds the shaft. By means of such a design of the wheel bearing pre-seal, a particularly excellent sealing effect is achieved. In addition, an imbalance of moving parts is avoided, so that the true running of the wheel hub is not affected.

A development of the invention provides that, for the formation of a drain channel, the pre-seal receiving area is interrupted in a particular angular range. The pre-seal receiving area is to that extent not formed continuously peripherally but instead interrupted in the particular angular range. To that extent, in the particular angular range, the seal protrusion does not engage in the pre-seal receiving area. The interruption of the pre-seal receiving area is used for the formation of the drain channel, so that moisture accumulating in the pre-seal receiving area can be discharged through the drain channel, preferably by gravity.

The particular angular range is selected, for example, in such a manner that the pre-seal receiving area is interrupted for the formation of the drain channel in the installation position of the wheel bearing arrangement at a geodetically lowest site. The drain channel preferably reaches through the wheel support in at least some sections, in particular starting from an inner peripheral surface of the wheel bearing receiving area or the outer peripheral surface of the outer ring in radial direction up to an outer side of the wheel support. To that extent, the drain channel reaches through a wall of the wheel support in radial direction preferably completely, while the wall limits the wheel bearing receiving area in radial direction inward.

A preferred additional embodiment of the invention provides that the outer ring is designed to be asymmetric at least in the angular range, in particular it has a drain bevel. The asymmetric design, for example, in the form of the drain bevel, is here formed in radial direction outward on the outer ring, namely on its side facing the wheel bearing pre-seal. The asymmetric design or drain bevel can naturally be designed to be continuous peripherally. However, particularly preferably, it is present only in the angular range. Preferably, viewed in peripheral direction, the asymmetric design or the drain bevel is continuous on both sides, that is to say it has no abrupt ends.

In the context of an additional design of the invention, it is possible to provide that, on the wheel bearing pre-seal, a peripherally continuous rotation angle encoder ring with at least one rotation angle encoder element is secured, in particular on the side of the wheel bearing pre-seal facing away from the wheel bearing. The rotation angle encoder ring is part of a rotation angle encoder used for determining the rotation angle position of the wheel hub with respect to the wheel support, for example, for determining an absolute or a relative angular rotation position.

The rotation angle encoder ring is designed to be continuous peripherally and it has at least one rotation angle encoder element. Preferably, the rotation angle encoder ring consists of a stiffer material than the wheel bearing pre-seal or is designed to be stiffer than said wheel bearing pre-seal. For example, for this purpose, the rotation angle encoder ring has a greater material thickness in axial direction than the wheel bearing pre-seal. The rotation angle encoder ring is secured to the wheel bearing pre-seal, in particular to the first arm. Here, the rotation angle encoder ring can be used for stiffening the wheel bearing pre-seal or the first arm of the wheel bearing pre-seal. The arrangement of the rotation angle encoder ring is preferably provided on the side of the wheel bearing pre-seal facing away from the wheel bearing. Naturally, an arrangement on the side facing the wheel bearing is also possible.

An additional embodiment of the invention provides that, adjacent to the rotation angle ring, a sensor device for the detection of the rotation angle encoder element is arranged. In addition to the rotation angle encoder ring, the sensor device is part of the rotation angle encoder. With the help of the sensor device, the rotation angle position of the wheel hub with respect to the wheel support can be detected, in particular incrementally. Viewed in longitudinal section or in axial direction, the sensor device is present adjacent to the rotation angle encoder ring. In axial direction, the distance between the sensor device and the rotation angle encoder ring with respect to the extent of the rotation angle encoder ring in axial direction is preferably at most 25%, at most 50%, at most 75%, at most 100%, at most 125% or at most 150%. Both the rotation angle encoder ring and the sensor device each have a planar surface, wherein the planar surface of the rotation angle encoder ring is arranged parallel to the planar surface of the sensor device and, viewed in longitudinal section, overlaps said sensor device.

An additional embodiment of the invention provides that the sensor device is annular and together with the rotation angle encoder ring forms a labyrinth seal. To that extent, it is also possible to provide that the sensor device completely surrounds the shaft peripherally so that it is designed to be continuous peripherally. Here, together with the rotation angle encoder ring, it forms the labyrinth seal, for the purpose of which the two above-explained planar surfaces are used in particular.

An additional preferred design of the invention provides that an additional seal is secured on the wheel bearing pre-seal, in particular on the side of the wheel bearing pre-seal facing the wheel bearing, which is in sealing contact with the outer ring. The additional seal consists, for example, of a softer material than the wheel bearing pre-seal, in particular of an elastic and/or porous material. The additional seal is preferably used for the additional sealing of the wheel bearing pre-seal with respect to the wheel bearing. For this purpose, the additional seal is secured to the wheel bearing pre-seal on the side of the wheel bearing pre-seal facing the wheel bearing. The additional seal is in sealing contact with the outer ring. For this purpose, it lies sealingly against the outer ring, for example.

Finally, in the context of an additional preferred design of the invention, it is provided that the sealing contact is established by means of a sealing element, for example, a peripheral sealing element, arranged on the outer ring. The sealing contact between the additional seal and the outer ring is thus present not directly but only indirectly via the sealing element. The sealing element is arranged on the outer ring and extends in axial direction in the direction of the additional seal, in particular up to the additional seal. Particularly preferably, viewed in longitudinal section or in axial direction, the sealing element engages in the additional seal.

The sealing element can be designed to be continuous peripherally. However, particularly preferably, it is interrupted analogously to the pre-seal receiving area in the particular angular range or at least in an angular range which overlaps the particular angular range. By means of such a design of the sealing element, moisture can be discharged reliably through the drain channel. The sealing element preferably consists of a more rigid material than the additional seal, for example, of metal. For example, the sealing element is present in the form of a metal plate which is arranged on the outer ring, in particular rotationally secured.

If the sealing element engages in the additional seal, then a labyrinth seal is implemented. For example, in the case of a mounting of the wheel bearing arrangement, the sealing element is pressed onto or into the additional seal. During subsequent rotation of the sealing element with respect to the additional seal, that is to say in particular during a rotation of the shaft and/or the wheel hub, the sealing element cuts into the additional seal. Thus, a labyrinth seal is produced, which has a minimal gap width but which is contactless. This ensures an excellent sealing with low friction at the same time.

BRIEF DESCRIPTION OF THE DRAWINGS

The invention is explained in further detail below in reference to the embodiment examples represented in the drawing, without any limitation of the invention occurring. The drawing shows.

DETAILED DESCRIPTION

Figure 1:
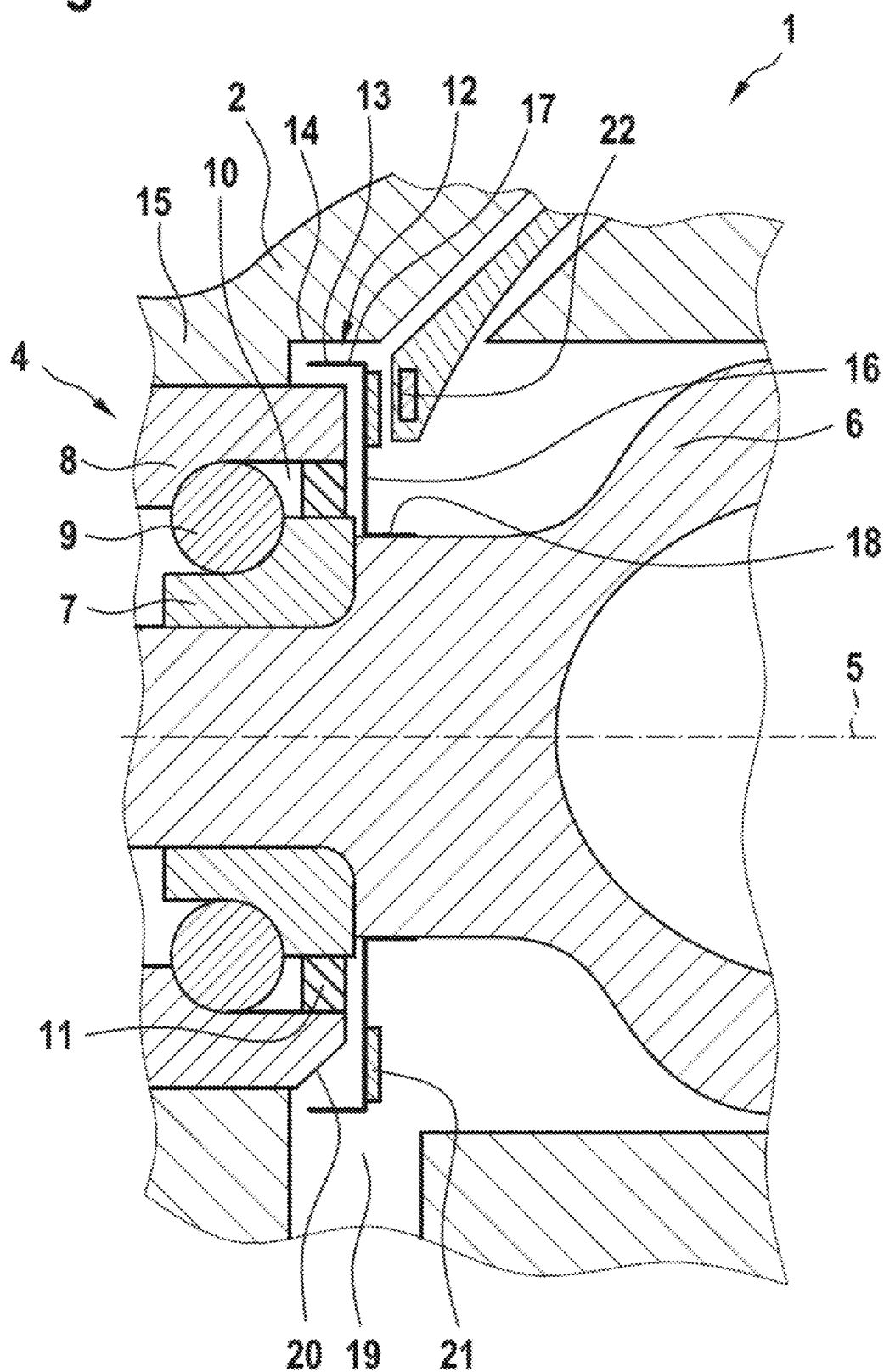
FIG. 1 a diagrammatic partial longitudinal sectional representation of a wheel bearing arrangement for a motor vehicle in a first embodiment, and FIG. 2 a partial longitudinal sectional representation of the wheel bearing arrangement in a second embodiment.

FIG. 1 shows a diagrammatic representation of a wheel bearing arrangement 1 of a motor vehicle, not represented in further detail. The wheel bearing arrangement 1 comprises a wheel support 2 which is here represented only in some sections. The wheel support 2 is coupled, for example, via at least one suspension link to a body of the motor vehicle. The wheel support 2 is used for mounting a wheel hub which is not represented here. The wheel hub is mounted rotatably around a rotation axis 5 by means of a wheel bearing 4 with respect to the wheel support 2. In addition to the wheel hub, a shaft 6 is provided, which is also mounted rotatably around the rotation axis 5. In the embodiment example represented here, the shaft 6 is, for example, in the form of a universal shaft. The shaft 6 is preferably rotationally fixed to the wheel hub, for example, by means of a toothing. The shaft 6 can in principle assume any form and shape.

The wheel bearing 4 is designed as a roller bearing. It comprises an inner ring 7 and an outer ring 8. The inner ring 7 is rotationally connected to the wheel hub, in particular it is designed so as to form a single piece and/or to be of uniform material with the wheel hub. Between the inner ring 7 and the outer ring 8, several roller bodies 9 are rotatably arranged. The inner ring 7 and the outer ring 8 are spaced apart from one another in radial direction with respect to the rotation axis 5, forming a bearing gap 10. For the sealing of the bearing gap 10 with respect to an outside environment, a wheel bearing seal 11 is associated with the wheel bearing 4. Viewed in the longitudinal section represented here, said wheel bearing seal lies in radial direction inward against the inner ring and in radial direction outward against the outer ring 8, in each case sealingly. For example, the wheel bearing seal 11 which preferably consists of an elastic material is rotationally fixedly connected to the inner ring 7 or the outer ring 8 and it lies slidingly peripherally against the respective other ring, that is to say either the outer ring 8 or the inner ring 7.

To further improve the sealing of the wheel bearing 4 with respect to the outside environment, a wheel bearing pre-seal 12 is provided. This wheel bearing pre-seal is arranged adjacently to the wheel bearing 4 and rotationally fixed connected to the shaft 6 and thus in a rotationally fixed manner to the wheel hub. The wheel bearing pre-seal 12 has a seal protrusion 13 which engages in a pre-seal receiving area 14 which is formed between the outer ring 8 and the wheel support 2. Here, the pre-seal receiving area 14 is limited, on the one hand, by the outer ring 8 and, on the other hand, by the wheel support 2 or a wall 15 of the wheel support 2.

The wheel bearing pre-seal 12 preferably consists of a reshaped plate. For example, it comprises a first arm 16 and a second arm 17. The first arm 16 is secured, on the one hand, on the shaft 6, in particular via and/or by means of a third arm 18. On the other hand, starting from the first arm 16 is the second arm 17, which in turn forms the seal protrusion 13. The second arm 17 and the third arm 18 are preferably angled in each case with respect to the first arm 16.

The first arm 16 is arranged in axial direction spaced apart from the wheel bearing 4, in particular from the outer ring 8. In contrast, the second arm 17 extends in the form of a seal protrusion 13 into the pre-seal receiving area 14 which is limited by the outer ring 8. To that extent, viewed in longitudinal section or in axial direction, the second arm 17 is present at least partially in a manner so that it overlaps the wheel bearing 4, in particular the outer ring 8. The seal protrusion 13 is present in a contactless manner in the pre-seal receiving area 14, that is to say it is spaced both from the wheel bearing 4 and from the wheel support 2 or the wall 15.

The wheel bearing pre-seal 12 surrounds the shaft 6 continuously peripherally with respect to the rotation axis 5. Here, in addition, it preferably has a constant longitudinal section or cross section. The pre-seal receiving area 14, on the other hand, is interrupted in a particular angular range which can only be seen partially here, for the formation of a drain channel 19. In addition, it is possible to provide that the outer ring 8 of the wheel bearing 4 has a drain bevel 20, that is to say a slanted surface, at least in the angular range. The drain bevel 20 is formed on said outer ring on the side of the outer ring 8 facing the wheel bearing pre-seal 12.

Moreover, it is possible to provide that, on the wheel bearing pre-seal 12, a rotation angle encoder ring 21 is secured. This rotation angle encoder ring is preferably designed to be continuous peripherally and uniform. On the rotation angle encoder ring 21, at least one rotation angle encoder element can be arranged. Preferably, the rotation angle encoder ring 21 is present on the side of the wheel bearing pre-seal 12 facing away from the wheel bearing 4. Opposite the rotation angle encoder ring 21, a sensor device 22 is arranged, which is used for detecting the rotation angle encoder element and thus for determining a rotation angle position of the wheel hub or of the shaft 6. As represented here, the sensor device 22 can be present peripherally only in some sections. However, alternatively, it is also possible to provide that the sensor device 22 is designed to be continuous peripherally, analogously to the rotation angle encoder ring 21. In this case together with the rotation angle encoder ring 21, it can form an additional labyrinth seal.

Figure 2:
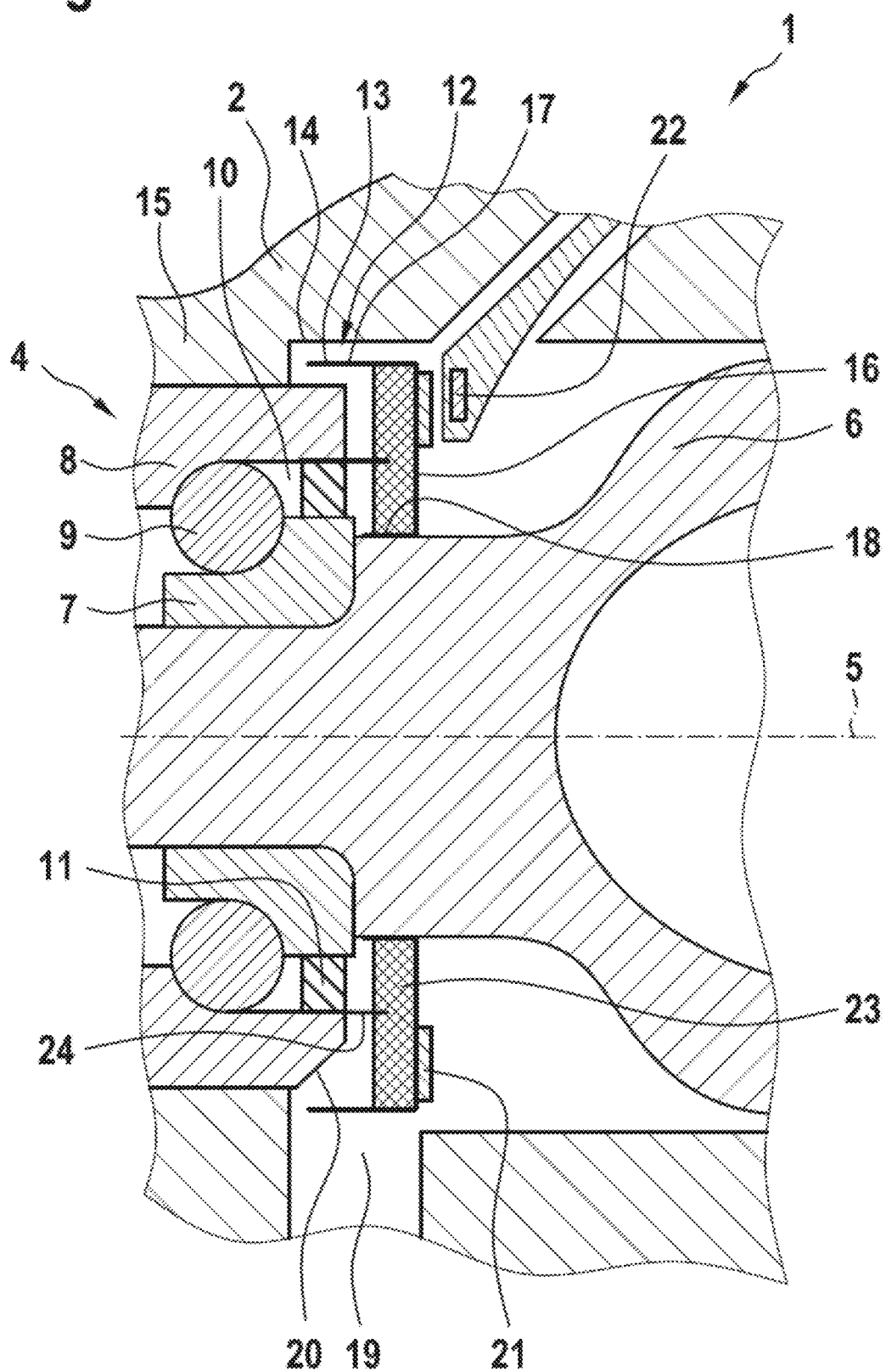

FIG. 2 shows a diagrammatic partial longitudinal sectional representation of the wheel bearing arrangement 1 in a second embodiment. It is designed basically analogously to the first embodiment, so that reference is made to the above explanations. Below, only the differences are discussed. These differences lie in the fact that an additional seal 23 is secured on the wheel bearing pre-seal 12. Preferably, the additional seal 23 extends in radial direction starting from the second arm 17 up to the third arm 18. The third arm 18 can here protrude in another direction in axial direction in comparison to the first embodiment. Correspondingly, the arms 17 and 18 protrude starting from the first arm 16 in the same direction, namely in the direction of the wheel bearing 4. To that extent, the additional seal 23 is present between the arms 16, 17 and 18 or on each of the arms 16, 17 and 18.

The additional seal 23 is arranged on the side of the wheel bearing pre-seal 12 facing the wheel bearing 4. It is here in sealing contact with the outer ring 8 of the wheel bearing 4. The sealing contact is present via a sealing element 24 which is arranged or secured on the outer ring 8. For example, the sealing element 24 is held clamped between the wheel bearing seal 11 and the outer ring 8. It is also possible to provide that the sealing element 24 is part of the wheel bearing seal 11. The sealing element 24 extends in radial direction up to the additional seal 23. The sealing element 24 preferably consists of a harder material than the additional seal 23 or conversely the additional seal 23 consists of a softer and/or more elastic material than the sealing element 24.

To that extent, during an operation of the wheel bearing arrangement 1, a working area in the additional seal 23 is cut free or ground free from the sealing element 24. Such a design enables a sealing of the wheel bearing 4 with minimal tolerances, which is designed individually and as sealingly as possible for each wheel bearing arrangement 1.

The invention claimed is:

1. A wheel bearing arrangement for a motor vehicle, comprising:
 a wheel support;
 a wheel hub, which is rotatably mounted on the wheel support by a wheel bearing, fixed rotationally to a shaft, and provides an attachment to secure a wheel; and
 a wheel bearing seal, which sealingly lies against an inner ring of the wheel bearing and against an outer ring of the wheel bearing, and which is bounded axially along a rotation axis of the wheel hub by the inner ring and the outer ring so as to not protrude axially beyond the wheel bearing,
 wherein the inner ring sits on the shaft and the outer ring is secured to the wheel support,
 wherein the wheel bearing arrangement further comprises a wheel bearing pre-seal separate from the wheel bearing seal,
 wherein the wheel bearing pre-seal is rotationally fixed to the shaft adjacent to the wheel bearing and engages by a seal protrusion with a pre-seal receiving area,
 wherein the pre-seal receiving area is formed in at least some sections between the outer ring and the wheel support,
 wherein the seal protrusion of the wheel bearing pre-seal engages the pre-seal receiving area in a contactless manner.

2. The wheel bearing arrangement according to claim 1, wherein, viewed in longitudinal section with respect to the rotation axis of the wheel hub, the wheel bearing pre-seal comprises a first arm engaging on the shaft and a second arm which forms the seal protrusion and is angled with respect to the first arm.

3. The wheel bearing arrangement according to claim 2, wherein, peripherally with respect to the rotation axis of the wheel hub, the wheel bearing pre-seal continuously surrounds the shaft.

4. The wheel bearing arrangement according to claim 2, wherein the pre-seal receiving area is interrupted in a particular angular range about the rotation axis of the wheel hub for the formation of a drain channel.

5. The wheel bearing arrangement according to claim 2, wherein the outer ring is designed as asymmetric about the rotation axis of the wheel hub in a particular angular range to form a drain bevel.

6. The wheel bearing arrangement according to claim 2, wherein, on the wheel bearing pre-seal, a peripherally continuous rotation angle encoder ring comprising at least one rotation angle encoder element is secured on the side of the wheel bearing pre-seal facing away from the wheel bearing.

7. The wheel bearing arrangement according to claim 1, wherein, peripherally with respect to the rotation axis of the wheel hub, the wheel bearing pre-seal continuously surrounds the shaft.

8. The wheel bearing arrangement according to claim 7, wherein the pre-seal receiving area is interrupted in a particular angular range about the rotation axis of the wheel hub for the formation of a drain channel.

9. The wheel bearing arrangement according to claim 7, wherein the outer ring is designed as asymmetric about the rotation axis of the wheel hub in a particular angular range to form a drain bevel.

10. The wheel bearing arrangement according to claim 7, wherein, on the wheel bearing pre-seal, a peripherally continuous rotation angle encoder ring comprising at least one rotation angle encoder element is secured on the side of the wheel bearing pre-seal facing away from the wheel bearing.

11. The wheel bearing arrangement according to claim 1, wherein the pre-seal receiving area is interrupted in a particular angular range about the rotation axis of the wheel hub for the formation of a drain channel.

12. The wheel bearing arrangement according to claim 11, wherein the outer ring is designed as asymmetric about the rotation axis of the wheel hub at least in the particular angular range to form a drain bevel.

13. The wheel bearing arrangement according to claim 12, wherein, on the wheel bearing pre-seal, a peripherally continuous rotation angle encoder ring comprising at least one rotation angle encoder element is secured on the side of the wheel bearing pre-seal facing away from the wheel bearing.

14. The wheel bearing arrangement according to claim 11, wherein, on the wheel bearing pre-seal, a peripherally continuous rotation angle encoder ring comprising at least one rotation angle encoder element is secured on the side of the wheel bearing pre-seal facing away from the wheel bearing.

15. The wheel bearing arrangement according to claim 1, wherein, on the wheel bearing pre-seal, a peripherally continuous rotation angle encoder ring comprising at least one rotation angle encoder element is secured on the side of the wheel bearing pre-seal facing away from the wheel bearing.

16. The wheel bearing arrangement according to claim 15, wherein a sensor device for detection of the at least one rotation angle encoder element is arranged adjacently to the peripherally continuous rotation angle encoder ring.

17. The wheel bearing arrangement according to claim 16, wherein the sensor device is annular and forms a labyrinth seal together with the peripherally continuous rotation angle encoder ring.

18. The wheel bearing arrangement according to claim 1, wherein, on the wheel bearing pre-seal, an additional seal is secured on the side of the wheel bearing pre-seal facing the wheel bearing,
 wherein the additional seal is in sealing contact with the outer ring via a sealing element held between the wheel bearing seal and the outer ring.

\* \* \* \* \*